United States Patent
Gorges

[11] 3,743,219
[45] July 3, 1973

[54] HIGH LIFT LEADING EDGE DEVICE

[75] Inventor: Friedrich J. Gorges, Dietzenbach-Steinberg, Germany

[73] Assignee: The Boeing Company, Seattle, Wash.

[22] Filed: June 30, 1971

[21] Appl. No.: 175,987

[52] U.S. Cl. .............................. 244/42 CA
[51] Int. Cl. .............................. B64c 3/28
[58] Field of Search .............. 244/42 CA, 42 D, 244/42 R

[56] References Cited
UNITED STATES PATENTS

| | | | |
|---|---|---|---|
| 3,504,870 | 4/1970 | Cole et al. | 244/42 R |
| 3,556,439 | 1/1971 | Autry | 244/42 R |
| 3,363,859 | 1/1968 | Watts | 244/42 CA |

*Primary Examiner*—Milton Buchler
*Assistant Examiner*—Carl A. Rutledge
*Attorney*—Glen Orlob

[57] ABSTRACT

The retractable leading edge wing flap has a skin surface with tapered thickness in order that it can more easily assume the desired nonuniform degree of curvature when the flap is in its extended position. Through the inherent resiliency of the flap skin surface material in combination with an actuating mechanism having a minimum of operating elements, the surface of the flap is provided with a variable contour thereby producing a variable camber to the flap panel and likewise to the wing airfoil section that is in combination therewith. More specifically, the flap extension and retraction mechanism operates in a chordwise plane and requires a maximum of five links to produce the desired result. Further, the actuating mechanism operates to position the flap panel relative to the fixed wing leading edge so as to vary the wing airfoil section aerodynamic flow characteristics by changing the total overall amount of effective wing camber. For the landing condition, the arrangement of the linkage mechanism produces an angular relationship of the flap chord plane relative to the wing chord plane such that the overall aerodynamic affect is a greater airfoil section camber at said landing condition than at the take off condition. Also, the arrangement of the linkage mechanism for the landing condition is such that the leading edge wing flap is extended further forward from the relatively fixed leading edge of the main wing section in addition to being spaced away from the wing leading edge, to form an aerodynamic slot; whereas, at the take off position the movable flap section and wing leading edge are in abutment relation thereby forming a substantially continuous upper surface without the slot.

6 Claims, 6 Drawing Figures

INVENTOR,
FRIEDRICH F. GORGES
BY

AGENT

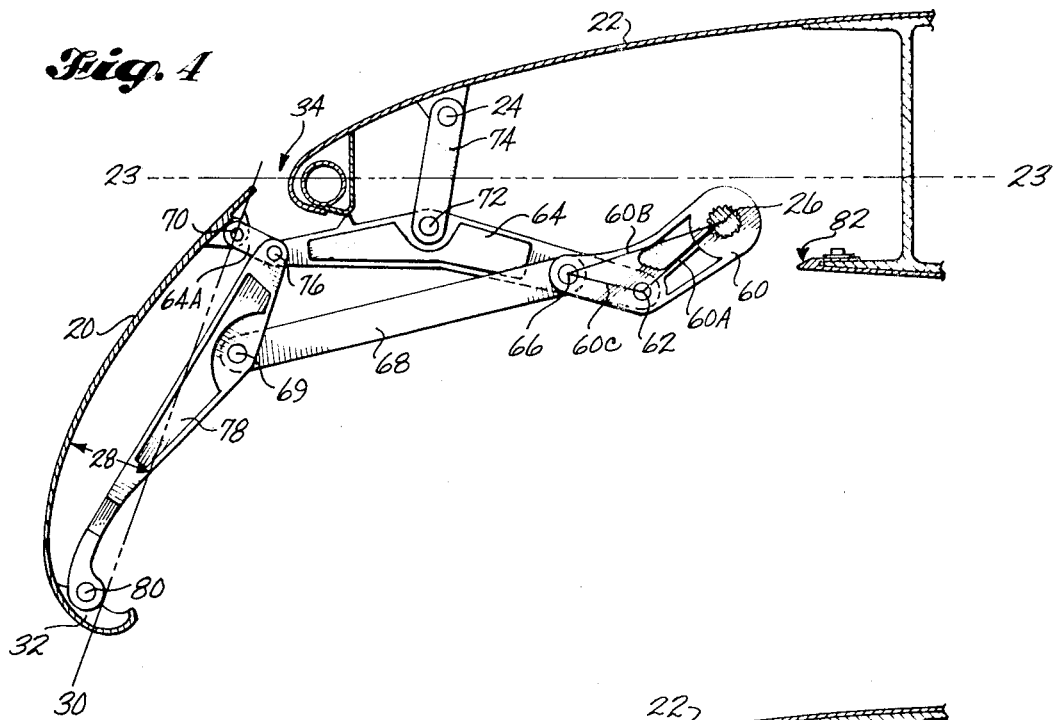
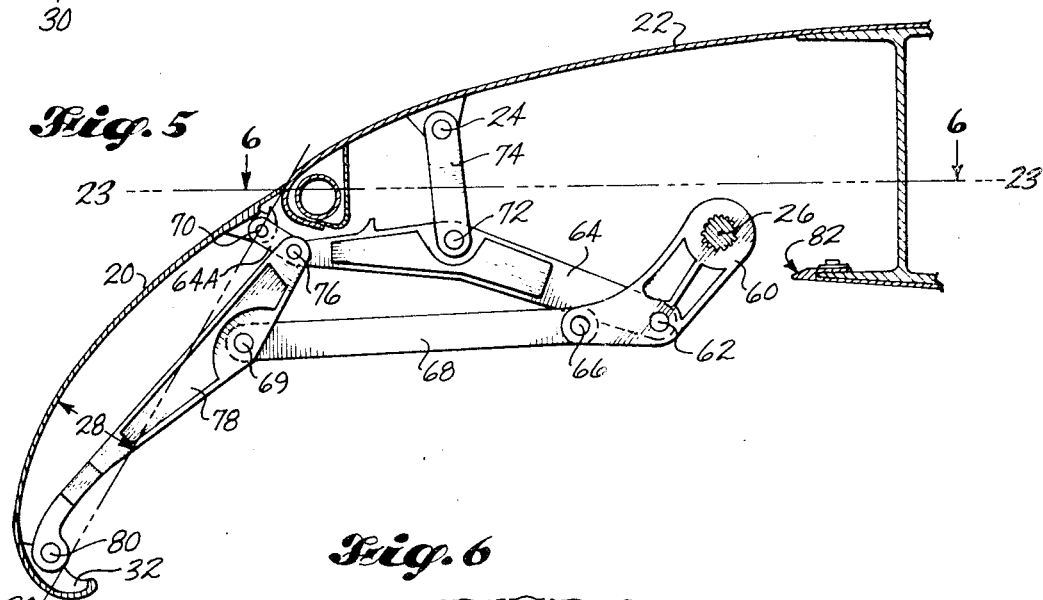
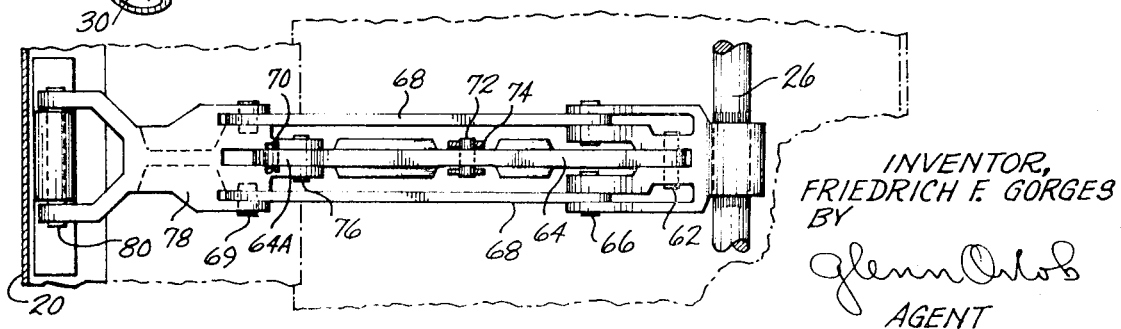

HIGH LIFT LEADING EDGE DEVICE

SUMMARY OF THE INVENTION

The invention relates to a high lift leading edge device for producing a variable camber airfoil section for the wing of an aircraft and more particularly to the articulating mechanism for moving the leading edge flap device from its retracted position in the lower surface of the wing, to its extended position in front of the wing thereby increasing the wing chord and forming an increase in the aerodynamic camber of the combined flap and wing airfoil section for improving lift characteristics for slow speed flight such as take off or landing. When the leading edge flap device is in its retracted position, its surface contour is somewhat flattened to conform to the desired aerodynamic shape of the undersurface of the fixed wing airfoil section whereas, when the leading edge device is in its extended position it has a curved surface contour that improves the aerodynamic characteristics of the increased chord and camber of the wing. Also, when the leading edge flap is in the extended position, it is further positionable from a gap, to a no-gap relationship with respect to the leading edge of the fixed wing portion, for further varying the aerodynamic characteristics of the overall wing section.

It is generally known that in extensible leading edge slat devices, the slat contours are generally dictated by the desired high speed airfoil section at an efficient cruise condition and that the individual slat components form an integral part of the forward section of the wing when in their retracted position; the contour of which does not change when extended. Therefore, the overall external contour of the slat does not provide the most desirable aerodynamic shape when it is extended forward and downward to increase the wing chord and camber for maximum low speed performance. Further, the mechanism for positioning the slats such as tracks and rollers are not entirely trouble free due to wing bending loads. Further, they are time consuming to adjust and therefore costly to operate.

Generally, the variable camber leading edge flaps, such as those used on the Boeing 747 type airplane, have a contoured aerodynamic shape but they are not positionable to provide a gap or no gap aerodynamic slot between the flap segment and the leading edge of the main wing. Also, some have a separate bullnose which does not present a continuous chordwise frontal surface but results in a continuous spanwise seam exposed to the airflow. In addition, the actuating mechanism generally requires a larger number of parts than the present invention.

An object of the present invention is to provide a wing leading edge flap system with a greater coefficient of lift during low speed operation such as take off or landing than the existing systems provide, without compromising the airfoil shape required for high speed operation.

Another object is to provide a wing leading edge with optimum airfoil shape leading edge flap system for take off and landing operation by providing a variable camber wing flap with two operative extended positions in combination with a different degree of camber at each of said operative positions.

One of the advantages of the present invention, is that the wing leading edge flap actuating mechanism has relatively few parts thereby providing for minimal maintenance and cost which makes it ideally suitable for use in the modification of existing airplanes as well as in new airplane design.

These, as well as other objects and advantages of the invention, will be more clearly understood from the following description when read with reference to the accompanying drawings.

BRIEF DESCRIPTION OF THE DRAWINGS

FIG. 4 is a view similar to FIG. 1 with the leading edge flap panel in the landing condition including an aerodynamic slot.

FIG. 5 is a view similar to FIG. 1 with the leading edge flap panel arranged in the take off condition with a no-gap relationship to the leading edge of the main wing.

FIG. 6 is a sectional top view taken along the lines 6—6 of FIG. 5 in the direction indicated.

DESCRIPTION OF THE PREFERRED EMBODIMENTS

The leading edge high lift system of the present invention comprises a variable camber leading edge wing flap having a chord-wise arranged extension and retraction linkage mechanism in combination with a powered actuation system.

Figure 1:
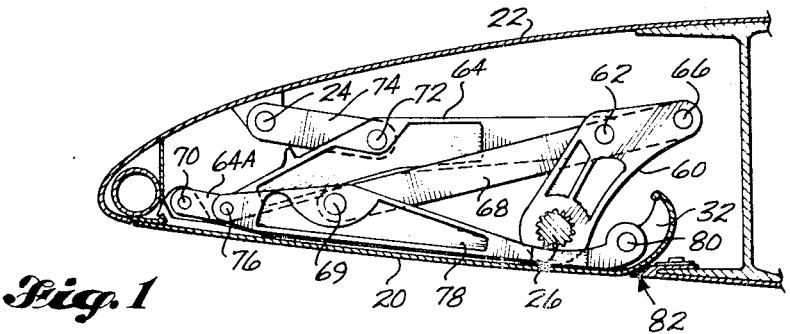
FIG. 1 is a chordwise cross sectional view of the variable camber leading edge wing flap and its extension and retraction linkage mechanism shown in the retracted or cruise position.

FIGS. 1 to 6 depict the preferred embodiment of the present invention comprising a five linkage mechanism in a chord-wise plane. For each spanwise set of linkage mechanism, the lower skin surface of the wing leading edge or flap panel 20 is pivotally suspended from the relatively fixed wing section 22 by two structural attachment points, 24 forward and 26 aft. The flap panel 20 in its retracted position as shown in FIG. 1, completes the undersurface nose portion or airfoil profile of the main fixed wing of the airplane and allows a desired cruise wing contour when retracted. The flap panel 20 may be composed of a glass fiber material, a honeycomb sandwich composite, a flexible preformed metal, etc., that is designed to produce the desired aerodynamic contour when the flap is in its stowed or retracted position. To produce the proper degree of aerodynamic curvature in one of the operative extended positions, the skin thickness is designed to be tapered chordwise such that when flexed by the linkage mechanism as hereinafter described, it produces the proper amount of camber 28 with respect to the flap chord plane 30. Also, the variation in thickness of the flap skin from the lesser thickness at the bullnose 32 or leading edge of the flap panel to a greater thickness towards its trailing edge, determines to a great extent the flap chordwise position at which the greatest amount of camber occurs. In the present invention it occurs forward of approximately the thirty percent flap chord point.

When the flap is in one of its operative extended positions, such as the landing position shown in FIG. 4, an aerodynamic slot 34 is created between the flap trailing edge and the leading edge of the relatively fixed wing. When the flap is in its most forward operative position, such as the take off position shown in FIG. 5, the aerodynamic slot 34 is closed off and a substantially continuous upper wing surface is presented to the oncoming airstream.

Figure 2:
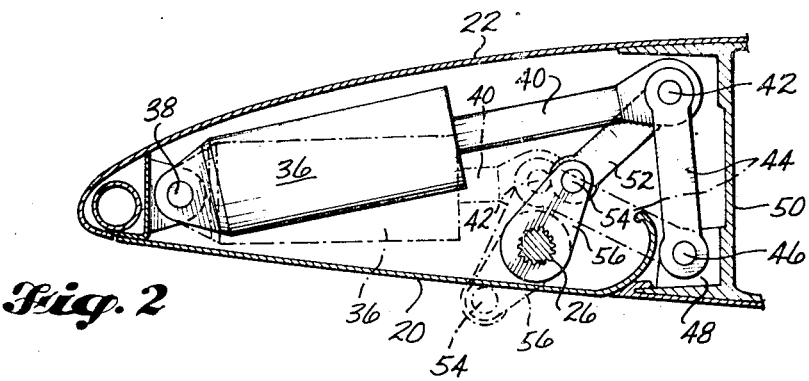
FIG. 2 is a chordwise cross sectional view, taken at a different spanwise location from that of FIG. 1, showing the powered actuation system for the high-lift leading edge device positioned in its stowed or cruise position.

FIG. 2 depicts an actuation system embodiment for the high lift leading edge device. The arrangement of the power hinge mechanism is shown with the leading edge flap in its retracted cruise position as illustrated in FIG. 1. The actuation system shown in FIG. 2 comprises a linear actuator 36 having its housing pivotally attached at 38 to fixed wing leading edge structure and its actuator rod 40 pivotally connected at 42 to the upper terminal of rocker arm 44. The lower end of rocker arm 44 is pivotally mounted at 46 to a bracket 48 which is attached to the front wing spar 50. Also, connected to the common pivot 42 is the upper terminal of connector link 52 which is pivotally connected at its lower terminal 54 to the torque arm 56. The rocker arm 44 carries the fulcrum 42 of the connector link 52 which rotatably drives the torque tube 26 by means of the torque arm 56. The torque arm 56 is fixedly mounted on torque tube 26 which in turn is rotatably supported by the relatively fixed wing structure. In operation, to extend the flap panel 20, the linear actuator 36 contracts thereby, rotating rocker arm 44 counterclockwise which in turn through the common pivotal connection 42 and connector link 52, rotates the torque arm 56 and the torque tube 26 through approximately 170° counterclockwise, which in turn is sufficient to operate the leading edge flap through to the desired positions as hereinafter described.

FIGS. 1, 3 to 5 are chordwise cross-sectional views of the preferred embodiment of the variable camber leading edge wing flap of the present invention and its extension and retraction linkage mechanism at various stages of operation.

Figure 3:
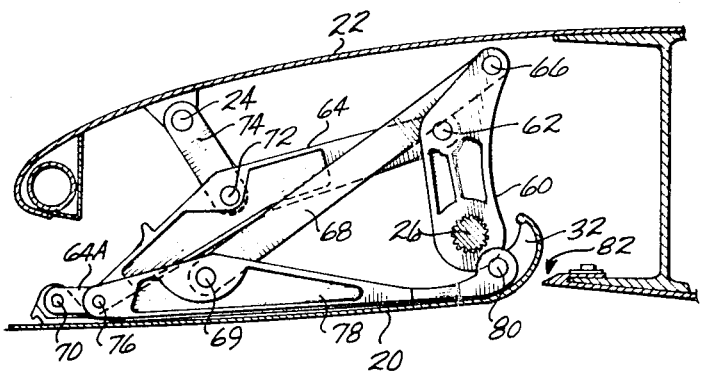
FIG. 3 is a view similar to FIG. 1 with the leading edge flap panel moved slightly out from its stowed position.

In the operation of positioning the leading edge flap 20 from the stowed position shown in FIG. 1, through the intermediate position shown in FIG. 3, to the first of two operating positions namely, the landing position shown in FIG. 4, the linear actuator 36 through operation of linkage mechanism as described and shown in FIG. 2 rotates the drive shaft 26, which in turn rotates the bellcrank 60 counterclockwise about the aft structural attachment pivot 26.

As shown in FIG. 4, the shorter driving arm 60A of the bellcrank 60 is pivotally connected at 62 to the aft end of lever 64 and the longer driving arm 60B, forming an angle of approximately 25 degrees with that of the shorter arm 60A, is pivotally connected at 66 to link 68. The other end of lever 64 connects to the flap panel 20 toward its trailing edge at pivotal connection 70. The lever 64, is supported at an approximate midlength position at pivotal connection 72, to the lower terminal of rocker arm 74 which swings about the fixed wing structurally pivot 24. The lever 64, at a point slightly inboard from its forward end, carries the fulcrum 76 of the flap chord lever 78. The flap chord lever 78 is driven to rotate about pivotal connection 76 by means of the longer driving arm 60B of the bellcrank 60 acting through connecting link 68 pivotally interconnected therewith through pivots 69 and 66, to extend and retract the flap panel 20. As the bellcrank 60 rotates counterclockwise from the stowed position of the flap as shown in FIG. 1, it pushes links 64 and 68 pivotally connected thereto at 62 and 66 respectively, forwardly and downwardly through the guiding action of rocking lever 74. The flap system initially rotates around point 24 to release the trailing edge of the flap panel from the under wing surface as shown by the intermediate position of the linkage in FIG. 3. Further, it will be noted that at this intermediate position, the flap chordwise pivotal connections 80, 70 and 76 are substantially in alignment such that the flap skin is at a lesser camber position, the least camber position being the stowed condition shown in FIG. 1. The flap skin 20 is attached through its leading edge bullnose 32 to one end of chord lever 78 at pivotal connection 80 and the trailing edge of the flap skin 20 is indirectly connected at 70 to the other end of chord lever 78 through a section or element 64A of lever 64 that extends between points 70 and 76. This section 64A in combination with chord lever 78 forms a scissors or toggle linkage arrangement having its fulcrum at 76. As the flap panel 20 rotates clockwise from its stowed position, this scissors linkage arrangement contours the flap skin 20 to give camber 28 to the flap panel, due to the foreshortening that takes place between points 80 and 70. The flap chord lever 78 is mounted to rotate clockwise with respect to link 64 about point 76 as the flap is forwardly extended; and as it does, point 70 moves towards point 80 which applies a bending force to the flap skin to increase its curvature and likewise its camber. This curved flap surface provides a desirable aerodynamic flow over the combined flap and leading edge surface of the fixed wing 22 to prevent separation of the airflow on the upper wing surface.

When the flap panel 20 is in the operative landing position shown in FIG. 4, an aerodynamic gap 34 is created between the trailing edge of the flap panel 20 and the leading edge of the wing 22 which improves its slow speed aerodynamic performance.

The operation of the flap to the take off position is obtained by continuing rotation of the drive bellcrank 60 in the same direction through the landing position shown in FIG. 4 to the take off position shown in FIG. 5. As the flap system rotates past the landing position to the take off position, the flap skin camber 28 is further increased and the aerodynamic gap is closed off thereby providing a lower overall total wing airfoil camber but with an improved aerodynamic flow characteristic for the take off condition. The leading edge flap extends the effective wing chord and through the sealing of the aerodynamic gap and increased skin curvature of flap gives better coefficient of lift by virtue of its aerodynamic shape.

The bullnose 32 or leading edge of the flap panel functions as a unitized part of the flap panel through its pivotal linkage connection and aids in flexing the skin of the flap panel to its aerodynamic contour as shown in the extended operative positions of FIGS. 4 and 5. All of the parts involved are geometrically arranged to enable the bullnose 32 as a rigid portion of the flexible flap, to move clear in and out of the fixed structure forward of the front spar location. As the last part of the motion during retracting the bullnose 32 contacts the seal 82.

While the invention has been disclosed with reference to a preferred embodiment, it is to be understood that those modifications and changes which become obvious to a person skilled in the art as a result of the teachings hereof will be encompassed by the following claims:

What is claimed is:

1. A variable camber flap for the leading edge of an airfoil comprising: a flexible flap panel supported from the leading edge portion of the airfoil in an operative forwardly and downwardly extending position; a bellcrank pivotally supported at its main pivot from the leading edge portion of the airfoil about a fixed hinge line for rotation in a chordwise plane; a guide link forward of the bellcrank having upper and lower terminals, pivotally connected at its upper terminal to the leading edge portion of the airfoil; a main flap support link, fore and aft extending, pivotally connected at its aft terminal to a first arm of the bellcrank, pivotally connected at its forward terminal to the trailing edge portion of the flap and pivotally supported at approximately its mid-point to the lower terminal of the guide link; a flap chord link pivotally supported at its upper terminal from a forward portion of the main flap support link and pivotally connected at its lower terminal to the leading edge portion of the downwardly and forwardly extending flap; an interconnecting link, fore and aft extending, pivotally connected at its forward terminal to an intermediate portion of the flap chord link and pivotally connected at its aft terminal to the other arm of the bellcrank; and actuating means for rotating the bellcrank about its main pivot causing the flap to be retracted from its operative forwardly and downwardly extending position, into the under surface of the airfoil.

2. The structure as set forth in claim 1, wherein said flexible flap panel has a tapered skin thickness in a chordwise plane from a lesser thickness towards the leading edge of the flap panel to a greater thickness towards its trailing edge when the flap is in an operative forward extended position.

3. The structure as set forth in claim 1, wherein said fexible flap panel is positionable with respect to the leading edge of said airfoil so as to form an aerodynamic slot between the trailing edge of the flap panel and the leading edge of said airfoil when the flap is in a first operative forward extended position.

4. The structure as set forth in claim 3, wherein said flexible flap panel is further positionable with respect to the leading edge of said airfoil so as to form an abutment relation between the trailing edge of the flap panel and the leading edge of said airfoil to form a substantially continuous upper surface when the flap is extended further forward than said first operative forward extended position to a second extended position.

5. The structure as set forth in claim 4, wherein said flexible flap panel has less camber when in said first operative forward extended position than in said second extended position.

6. The structure as set forth in claim 5, wherein said flexible flap panel when in said first operative forward extended position has its chord plane positioned relative to chord plane of said airfoil such that a greater aerodynamic camber of the flap and airfoil combination is produced than at said second extended position.

* * * * *